US011717117B2

(12) United States Patent
Marx et al.

(10) Patent No.: US 11,717,117 B2
(45) Date of Patent: Aug. 8, 2023

(54) MOUNTING ASSEMBLY

(71) Applicant: STYLE IN STAINLESS CC T/A STEELCRAFT, Cape Town (ZA)

(72) Inventors: Jacobus Jerimias Marx, Cape Town (ZA); Wilhelm Lourens, Cape Town (ZA)

(73) Assignee: Style in Stainless CC T/A Steelcraft, Cape Town (ZA)

( * ) Notice: Subject to any disclaimer, the term of this patent is extended or adjusted under 35 U.S.C. 154(b) by 105 days.

(21) Appl. No.: 17/429,068

(22) PCT Filed: Feb. 6, 2020

(86) PCT No.: PCT/IB2020/050948
§ 371 (c)(1),
(2) Date: Aug. 6, 2021

(87) PCT Pub. No.: WO2020/161658
PCT Pub. Date: Aug. 13, 2020

(65) Prior Publication Data
US 2022/0125248 A1 Apr. 28, 2022

(30) Foreign Application Priority Data
Feb. 6, 2019 (ZA) .................. 2019/00762

(51) Int. Cl.
*A47K 5/04* (2006.01)
*F16B 9/00* (2006.01)
(Continued)

(52) U.S. Cl.
CPC ................ *A47K 5/04* (2013.01); *F16B 2/065* (2013.01); *F16B 5/02* (2013.01); *F16B 9/09* (2018.08); *A47K 10/10* (2013.01); *A47K 2201/02* (2013.01)

(58) Field of Classification Search
CPC .......... A47K 10/10; A47K 10/38; A47K 1/08; A47K 2201/00; F16B 9/052; F16B 9/054; F16B 21/10; F16M 13/00
See application file for complete search history.

(56) References Cited

U.S. PATENT DOCUMENTS 1,838,935 A * 12/1931 Fixsen .................. A47B 95/02
248/222.52
1,891,048 A * 12/1932 Keefe ..................... F16B 21/10
D6/550
(Continued)

FOREIGN PATENT DOCUMENTS

GB 2457377 A 8/2009
WO WO2014/054000 4/2014

OTHER PUBLICATIONS

International Search Report issued by the Australian Patent Office acting as International Searching Authority for International Patent Application No. PCT/IB2020/050948 dated Feb. 26, 2020 (4 pages in total).

*Primary Examiner* — Tan Le
(74) *Attorney, Agent, or Firm* — Dinsmore & Shohl LLP

(57) ABSTRACT

A mounting assembly (101, 201, 301, 401) for mounting an accessory (102, 202, 302, 402) is provided. The mounting assembly (101, 201, 301, 401) includes a mounting bracket (103, 203, 303, 403) with an aperture arranged to receive a fastener for fastening the mounting bracket (103, 203, 303, 403) to a surface. A supporting structure is provided between the mounting bracket (103, 203, 303, 403) and the accessory (102, 202, 302, 402) with an elongate hollow member (107, 207, 307, 407) substantially surrounding the supporting structure. The elongate hollow member (107, 207, 307, 407) is releasably secured to the mounting bracket (103, 203, 303, 403) with the mounting bracket (103, 203, 303, 403) and the elongate hollow member (107, 207, 307, 407) having (Continued)

complementary male-and-female mating formations which are arranged to inhibit rotation of the elongate hollow member (107, 207, 307, 407) relative to the mounting bracket (103, 203, 303, 403).

11 Claims, 8 Drawing Sheets

(51) Int. Cl.
  *F16B 5/02* (2006.01)
  *F16B 2/06* (2006.01)
  *A47K 10/10* (2006.01)

(56) References Cited

U.S. PATENT DOCUMENTS

| | | | | |
|---|---|---|---|---|
| 1,934,911 | A | * | 11/1933 | Campbell ............... A47H 1/102 |
| | | | | 248/222.14 |
| 1,962,739 | A | | 6/1934 | Hoegger |
| 2,158,734 | A | * | 5/1939 | Sladek .................... A47K 1/08 |
| | | | | 403/372 |
| 4,979,713 | A | | 12/1990 | Bell |
| 4,998,701 | A | | 3/1991 | Rawaid |
| 5,026,013 | A | * | 6/1991 | Robbins .................. F16B 9/052 |
| | | | | D8/352 |
| 5,664,751 | A | | 9/1997 | Lan |
| 6,244,549 | B1 | | 6/2001 | Ching |
| 6,651,830 | B2 | * | 11/2003 | Pan ........................ A47K 10/10 |
| | | | | 248/251 |
| 2002/0023993 | A1 | | 2/2002 | Fleischmann et al. |
| 2004/0187204 | A1 | | 9/2004 | Ouyoung |
| 2012/0119046 | A1 | | 5/2012 | Hsu et al. |

* cited by examiner

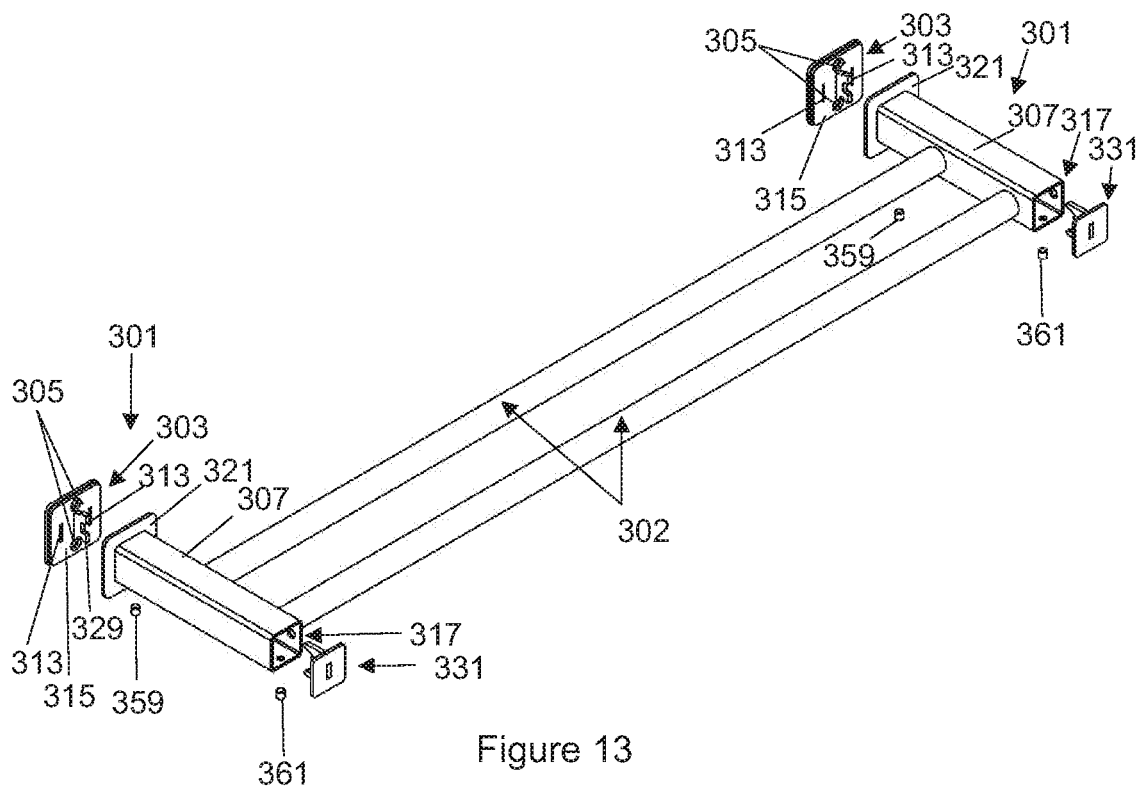
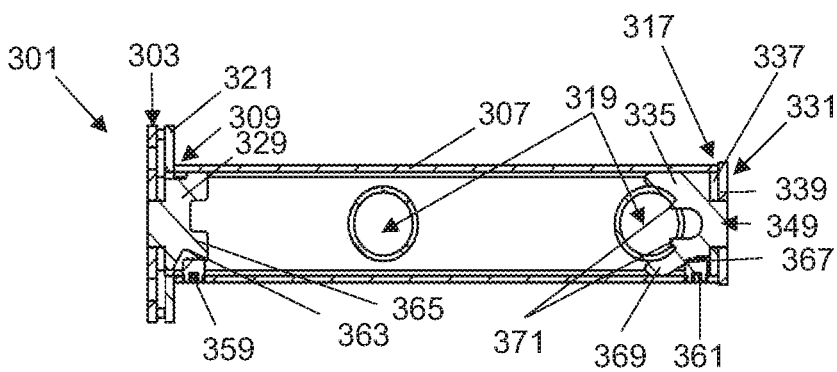
Figure 13
Figure 14
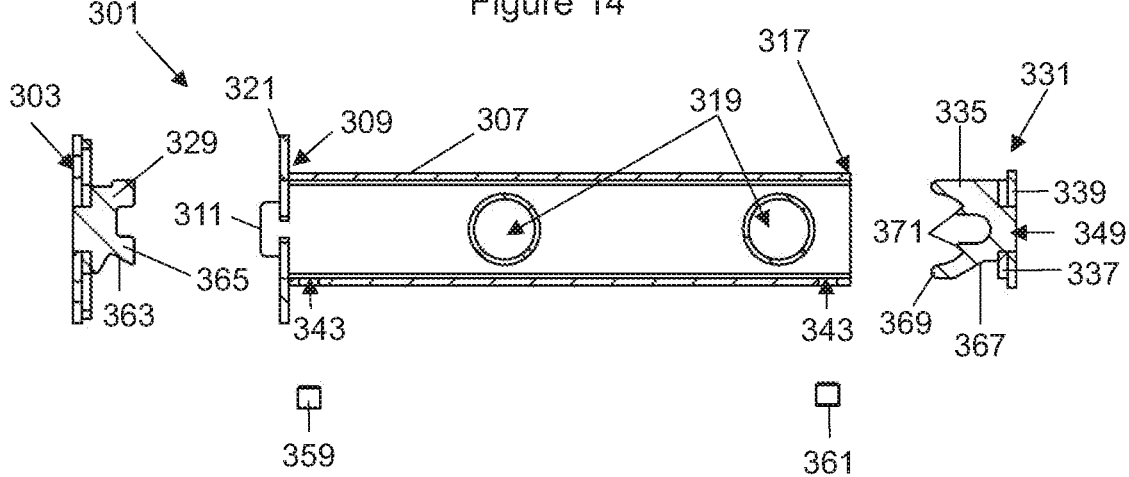
Figure 15

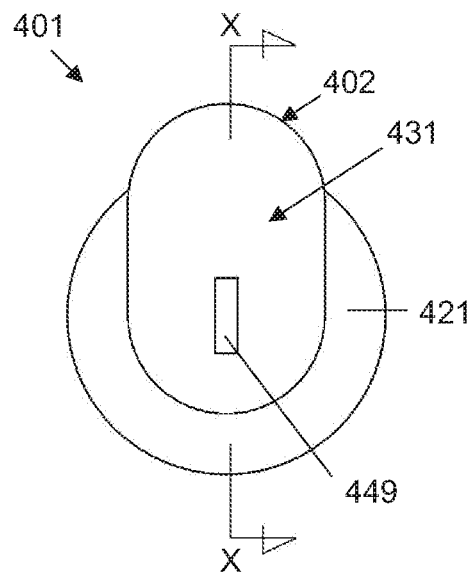
Figure 18
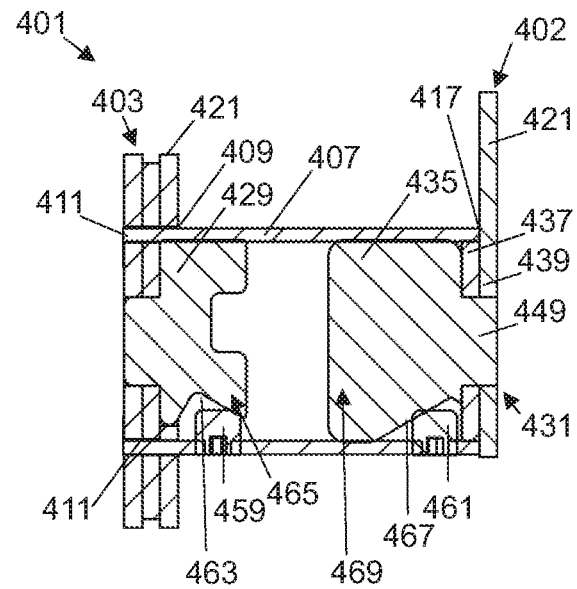
Figure 19
Figure 20
Figure 21

MOUNTING ASSEMBLY

CROSS-REFERENCE(S) TO RELATED APPLICATIONS

This application claims priority from South African patent application number 2019/00762 filed on the 6 Feb. 2019, which is incorporated by reference herein.

FIELD OF THE INVENTION

This invention relates to a mounting assembly. In particular, it relates to a mounting assembly used to fasten and maintain an accessory to a vertical structure such as a wall.

BACKGROUND TO THE INVENTION

Accessories need to be securely mounted to a vertical structure such as a wall to support their own weight and the weight of any objects they may hold. Accessories that are commonly wall-mounted include soap holders, dispensers, utensil holders, towel rails, toilet paper holders, shelves, hooks and the like. Most mounting brackets are directly fastened to a wall by having fasteners such as screws passing through a mounting bracket plate to secure the accessory to the wall. The exposed fasteners may be unsightly.

As a result, mounting bracket assemblies with covers or covered by the accessory were developed in terms of which a mounting bracket is first fastened to a wall and then an accessory or a cover is secured over the mounting bracket. The accessory or cover is usually fastened to the mounting bracket with a grub screw on the underside of the accessory or cover. Such mounting assemblies may not be secure against rotation when a substantial twisting force is applied to the accessory and/or cover. A second grub screw may be used to lock the cover or accessory in position and substantially prevent rotation thereof, but must be positioned relative to the first grub screw in a manner that may compromise the aesthetic quality of the mounting assembly.

Most mounting assembles include many machined parts and parts that need to be welded together to produce a secure mounting assembly that is also aesthetically pleasing. There is thus a need for a mounting assembly that alleviates the abovementioned problems, at least to some extent.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

As used herein, and unless the context indicates otherwise, the term "rotation" shall have its widest meaning and include both axial rotation about a common axis between two parts and rotation about a fixed point such as two-dimensional rotation in a plane about a fixed point.

SUMMARY OF THE INVENTION

In accordance with the invention there is a provided a mounting assembly for mounting an accessory. The assembly comprises a mounting bracket with an aperture arranged to receive a fastener for fastening the mounting bracket to a surface; an elongate hollow member which is releasably securable to the mounting bracket, the mounting bracket and the elongate hollow member having complementary male and female mating formations which are arranged to inhibit rotation of the elongate hollow member relative to the mounting bracket when secured thereto; and a supporting structure configured to be positioned between the mounting bracket and the accessory with, in an assembled condition, the elongate hollow member substantially surrounding the supporting structure.

A cover may be provided between the mounting bracket and the hollow member which is shaped to conceal the aperture. The cover may be complementarily shaped to the mounting bracket. The cover may have openings through which the male mating formations extend.

The complementary male-and-female mating formations may be in the form of mortise and tenon formations arranged to inhibit axial rotation and rotation in a plane generally transverse to the longitudinal axis of the hollow member relative to the mounting bracket. One or more tenon tongues may extend from the first end of the hollow member and one or more complementarily shaped mortise holes defined in the mounting bracket for receiving the tenon tongues. At least two tenon tongues may be provided on opposite sides of the end of the hollow member and at least two complementarily shaped mortise holes defined in spaced relation on a surface of the mounting bracket to receive the tenon tongues. The hollow member may be tubular and two circumferentially spaced arcuate tongues may extend from the first end of the hollow member so as to cooperate with two arcuate grooves in the mounting bracket. Alternatively, the hollow member may have a rectangular cross-sectional profile, in which case the tenon tongues and mortise holes are rectangular.

A locating formation for the accessory may be provided as a receptacle or slot in the hollow member that is configured to partially receive the accessory.

The supporting structure may include a projection on the mounting bracket which, in an assembled condition of the assembly, extends into a cavity defined by the hollow member and is configured to engage an internal surface of the elongate hollow member. A cap may be provided on an open, second end of the elongate hollow member, the cap having an internal portion which extends into the cavity defined by the hollow member and is configured to engage an internal surface of the hollow member. At least two set screws may extend through holes in the hollow member on the same side thereof, a first set screw engaging an inclined surface of the projection and the second set screw engaging an oppositely inclined surface of the cap to secure the mounting bracket and cap to the elongate hollow member.

The internal portion of the cap and projection may have complementary mating formations that are shaped to inhibit rotation of the cap, both axial rotation and rotation in a plane that is generally transverse to the longitudinal axis of the hollow member.

The cap may include receiving formations for the accessory.

Stated differently, there is provided a mounting assembly for mounting an accessory comprising: a mounting bracket with an aperture arranged to receive a fastener for fastening the mounting bracket to a surface: and a supporting structure provided between the mounting bracket and the accessory with an elongate hollow member substantially surrounding the supporting structure, wherein the elongate hollow member is releasably secured to the mounting bracket with the mounting bracket and the elongate hollow member having complementary male-and-female mating formations which are arranged to inhibit rotation of the elongate hollow member relative to the mounting bracket.

An embodiment of the invention will now be described, by way of example only, with reference to the accompanying drawings.

BRIEF DESCRIPTION OF THE DRAWINGS

In the drawings:

FIG. 13 is a three-dimensional view of a third embodiment of a mounting assembly for towel rails with the mounting assemblies on either end of the towel rails shown in a disassembled condition;

FIG. 14 is a cross-sectional view of the embodiment of FIG. 13 in an assembled condition;

FIG. 15 is a cross-sectional view of the embodiment of FIG. 13 in a disassembled condition;

FIG. 18 is a front view of the embodiment of FIG. 17 in an assembled condition;

FIG. 19 is a cross-sectional view of the embodiment of FIG. 17 viewed along the line X-X shown in FIG. 18;

FIG. 20 is a three-dimensional view of the embodiment of FIG. 17 in an assembled condition; and FIG. 21 is a side elevation of the embodiment of FIG. 17 in an assembled condition.

DETAILED DESCRIPTION WITH REFERENCE TO THE DRAWINGS

Figure 1:
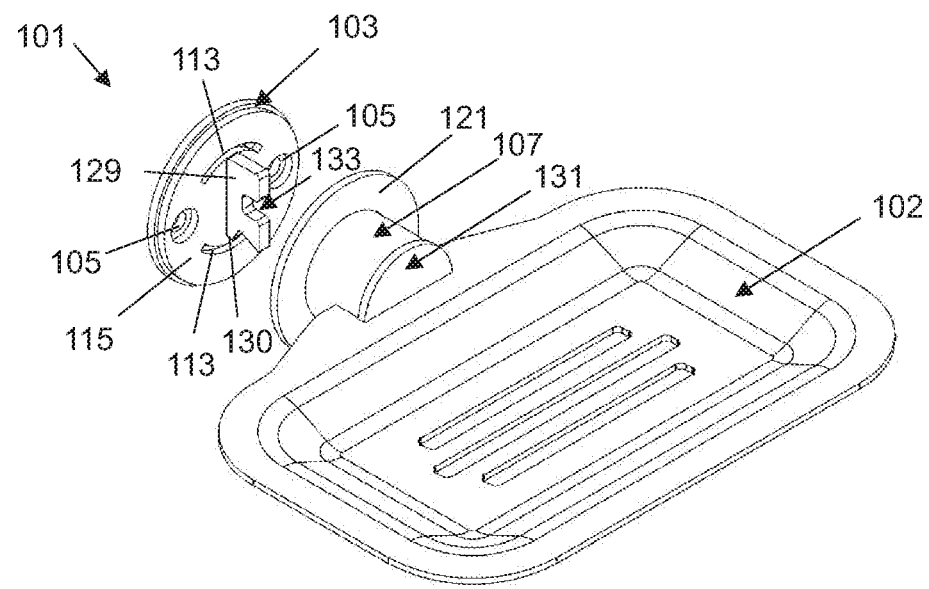
FIG. 1 is a three-dimensional view of an embodiment of a mounting assembly with a soap dish secured thereto with the mounting assembly in a disassembled condition.

A mounting assembly for mounting an accessory is provided. The mounting assembly may be used to securely mount an accessory such as bathroom accessory to a wall. The accessories may for example be soap dishes, towel bars, towel rings, shelves, toilet paper holders, hooks and the like.

The mounting assembly includes a mounting bracket that has a generally flat portion with at least one aperture through which a fastener such as a screw, bolt or nail can pass to secure the mounting bracket to a surface such as the generally flat surface of a wall. Two apertures are preferred to secure the mounting bracket in a level manner. The mounting bracket preferably has a generally flat configuration and may have any suitable shape. For example, the mounting bracket may be circular or rectangular.

A supporting structure is provided for the accessory and between the mounting bracket and the accessory with an elongate hollow member substantially surrounding the supporting structure. The elongate hollow member may form part of the supporting structure in certain embodiments.

The elongate hollow member is releasably secured to the mounting bracket. The hollow member has at least one open end which may be releasably secured to the mounting bracket with a set screw of the like. If the hollow member has a second open end, it may be at least partially covered by a cap secured to the hollow member which may, in certain embodiments, also provide engagement means between the mounting bracket and the accessory. The elongate hollow member may be tubular or may have a rectangular, triangular or other suitable shaped cross-sectional profile provided that it defines an internal cavity. The apertures for the fasteners of the on the mounting bracket and further parts of the supporting structure of the mounting assembly are concealed by way of the hollow member and a cover provided between the mounting bracket and the hollow member which are arranged to overlap the apertures. The cover extends at least partially over the mounting bracket so that at east the apertures, and as a result, the fasteners are hidden from view.

The mounting bracket and the elongate hollow member have complementary male-and-female mating formations which serve as locking formations and are arranged to inhibit or prevent rotation of the elongate hollow member relative to the mounting bracket. The complementary male-and-female mating formations are preferably in the form of mortise and tenon formations, the mortise hole having four shoulders for seating the tenon tongue therein and which inhibit axial rotation of the elongate hollow member about its own longitudinal axis and rotation in sagittal or frontal plane, i.e. in a plane that is in a transverse direction relative to the longitudinal axis of the hollow member when the end of the hollow member is joined to the mounting bracket. The mortise and tenon formations constrain axial, lateral and vertical rotation of the hollow member relative to the mounting bracket when the mounting assembly is mounted to a vertically extending wall in an operative condition. One or more tenon tongues may extend from the first end of the hollow member and one or more complementarily shaped mortise holes defined in the mounting bracket for receiving the tongues. At least two tenon tongues may be provided on opposite sides of the end of the hollow member and at least two complementarily shaped mortise holes defined spaced apart on the outer surface of the mounting bracket to receive the tenon tongues.

If the hollow member is tubular, the first, open end of the hollow member may include at least two equally circumferentially spaced tongues extending longitudinally from the first end of the tubular hollow member that are received within at least two arcuate grooves defined in the mounting bracket. The shoulders of the arcuate grooves abut against the side edges of the tongues to inhibit rotation of the tubular member relative to the mounting bracket, both axial rotation and tilting or pivoting of the tubular member relative to the mounting bracket as a fixed point. If the hollow member is rectangular-shaped, the tenon tongues and mortise holes may also be rectangular and parallel to each other on opposite sides of the end of the rectangular hollow member. The mortise holes will be complementarily shaped to the tongues and appropriately spaced on the mounting bracket to receive the tongues.

The cover may be complementarily shaped to the mounting bracket. The cover may therefore also have a generally flat configuration and may for example be circular if the mounting bracket is circular. The cover may be positioned between the mounting bracket and the elongate hollow member and have apertures through which the male mating formations on either one of the mounting bracket and elongate hollow member extend.

The hollow member may include a locating or receiving formation for the accessory such as a receptacle, aperture or slot defined in the hollow member which is configured to receive at least a part of the accessory. The locating formation may be at or near a second end of the elongate hollow member. The relative positioning of the locating formation on the hollow member will depend on the type of accessory and its configuration. The receptacle, aperture or slot may be suitably positioned on the hollow member to ensure that the hollow member lends some support to the accessory such as by way of an overlap joint with the accessory or the like. The accessory may be supported on the hollow member so that the accessory is also secure against rotation or movement in a plane relative to the hollow member in use. Alternatively, the accessory may be supported in a manner that ensures that it is capable of some rotation in use.

When the hollow member has two open ends, the assembly may include a cap on the open end of the hollow member opposite the end. The cap may be shaped to be held in abutment with and substantially close the open, second end of the elongate hollow member. The cap may also have an internal end portion which extends at least partially into a cavity defined by the hollow member and is configured to be held in abutment with the interior of the hollow member with a set screw.

The cap may include mating formations that cooperate with the mounting bracket. For example, the internal portion may be shaped to engage a projection on the mounting bracket which projects into the cavity. The projection may be positioned between the mating formations for the hollow member so as to project centrally into the cavity defined by the hollow member. One or more set screws such as grub screws may be used to hold the projection and cap in engagement with the hollow member and optionally with each other. For example, at least two set screws may extend through holes in the hollow member at an operatively underside thereof, a first set screw engaging an inclined surface of the projection and the second set screw engaging an oppositely inclined surface of the cap so that the two grub screws act to secure the hollow member to the mounting bracket and the cap to the hollow member and prevent the projection and cap from moving apart. The set screws press the projection and the cap firmly against the interior surface of the hollow member.

The complementary mating formations on the projection and cap may be shaped to inhibit rotation of the cap relative to the mounting bracket, in particular, to prevent rotation in a plane that is generally transverse to the longitudinal axis of the elongate hollow body, more particularly to inhibit or prevent rotation in a vertical direction under gravity when mounted to a vertical structure. For example, the projection may define an oblong recess, which extends crosswise relative to the longitudinal axis of the elongate hollow body, and that receives a complementarily shaped protrusion on the cap.

The cap may define attachment formations and/or supporting formations for the accessory, so that the complementary mating formations between the projection and cap also work to inhibit rotation, including rotation in a plane, and linear movement of the accessory relative to the mounting bracket in use.

The mounting assembly allows an accessory to be securely mounted to a vertical structure such as a wall to reduce rotation, pivoting, tilting or rattling of the various parts and its parts are arranged to conceal the fasteners used to fasten the mounting bracket to the wall.

A first embodiment of a mounting assembly (101) for mounting a soap dish accessory (102) is shown in FIGS. 1 to 6 and includes a generally planar and circular mounting bracket (103) with two apertures (105) arranged to receive fasteners such as screws for fastening the mounting bracket flush against a generally flat surface.

Figure 2:
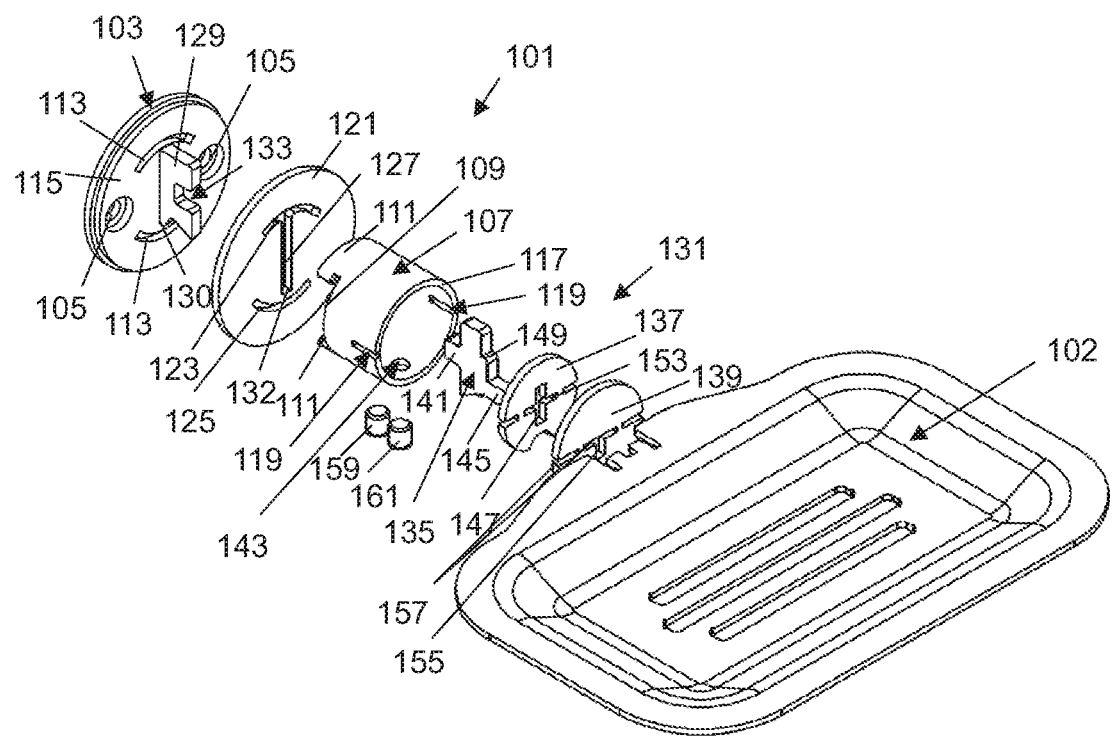
FIG. 2 is an exploded three-dimensional view of the embodiment of FIG. 1 and the soap dish.
Figure 3:
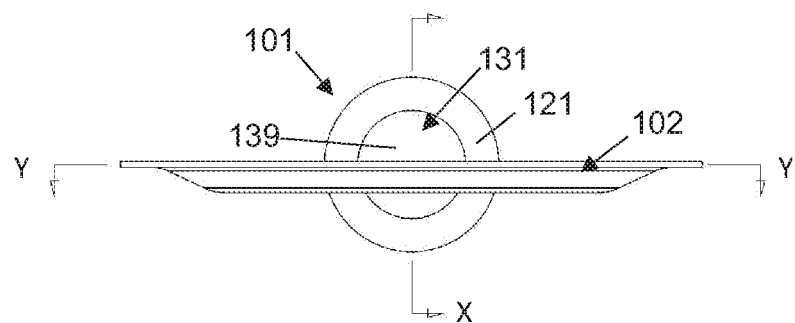
FIG. 3 is a front view of the embodiment of FIG. 1 and the soap dish.

An elongate hollow member (107) that is tubular is releasably secured to the mounting bracket (103) so as to stand proud therefrom. The mounting bracket (103) and a first end (109) of the hollow member (107) have complementary male-and-female mating formations which are configured to prevent rotation of the elongate hollow member (107) relative to the mounting bracket (103). As shown in FIG. 2, a first set of complementary male-and-female mating formations are in the form of arcuate tongues and arcuate holes that form a mortise and tenon-like joint. Two circumferentially spaced arcuate tongues (111) extend lengthwise from the first end (109) of the hollow member (107) and two arcuate holes (113) are provided through the generally flat mounting bracket (103) for receiving the tongues (111). The tongues and holes cooperatively prevent rotation of the hollow member (107) relative to the mounting bracket (103) whilst providing a strong support of the hollow member (107) around a portion of the circumference of the hollow member (107) that is inserted into the mounting bracket (103).

An opposite, second end (117) of the elongate hollow member (107) has locating formations (119) in the form of two slots on opposite sides of the hollow member which are arranged to receive part of the soap dish accessory (102) and support it.

A cover (121) configured to be secured over the major surface (115) of the mounting bracket (103) is carried by the hollow member (107) by having the tongues (111) extend through arcuate openings (123, 125) in the cover (121). The cover (121) conceal the apertures (105) and fasteners (not shown) from view in the assembled condition of the mounting assembly. The cover also has a slot (127) extending from the uppermost tongue opening (123) partway along the length of the cover (121) and in the direction of the lowermost tongue opening (125). The slot (127) permits the projection (129) on the bracket (103) to extend therethrough. The projection (129) includes an abutment shoulder (131) that abuts against the inner edge (132) of the slot (127) when the cover is assembled to the mounting bracket (103).

The projection (129) on the mounting bracket (103) forms part of the supporting structure and provides mates with a cap (131) releasably secured to the open, second end of the elongate hollow member (107). The projection (129) has a recess (133) at its free end for receiving part of the cap (131).

The projection (129) projects from the major surface (115) at a position that is between the apertures (105) and the grooves (113) so that the projection (129) extends centrally through the cavity or enclosure defined by the hollow member (107).

The cap (131) is configured to be held in abutment with and extend between the projection (129) and the second end (117) of the tubular hollow member (107). In the embodiment of FIGS. 1 to 6, the cap (131) comprises several parts joined together. The cap (131) includes an interlocking member (135) and two receiving plates (137, 139) that are welded together. The accessory (102) is also welded to the cap (131). The interlocking member (135) has a protrusion (141) that is complementarily shaped to the recess (133) in the projection (129) on the mounting bracket (103). The recess is shaped to receive the protrusion (141) and secure the cap (131) against rotation in a generally transverse direction so that it does not rotate up and down in use.

The cap (131) includes further receiving formations arranged to receive and support the soap dish accessory (102) so as to also constrain its movement relative to the mounting bracket (103). The interlocking member (135) of the cap (131) has a support arm (145) extending in an opposite direction to the protrusion (141) and arranged to form an overlap joint with the accessory (102) so as the support the accessory on the support arm (145) in use. The plates (137, 139) sandwich the support arm and accessory together and within the end (117) of the hollow member (107) with the set screw (161) engaging the interlocking member (135) on its surface (167) to press the member (135) against the internal surface of the hollow member (107). The first plate (137) is sized and shaped to be received within the internal cavity of the tubular member (107) and includes operatively vertically extending apertures (147) through which the support arm (145) and a step (149) defined in the interlocking member (135) can pass so that the interlocking member (135) abuts the plate (137) at the step (149). The plate (137) also has operatively horizontally extending apertures (153) that receive and support parts of the soap dish (102). The second plate (139) is sized and shaped to abut against the end (117) of the hollow member (107) and has a vertically extending aperture (155) for the support arm (145) to extend through in the direction of the accessory (102) and horizontally extending apertures (157) that receive and support the soap dish accessory (102). The various parts of the cap (131), in particular the plates (137, 139) secure the soap dish accessory (102) joined to the cap (131) in place so that it is not able to rotate or move linearly relative to the mounting bracket (103).

Figure 4:
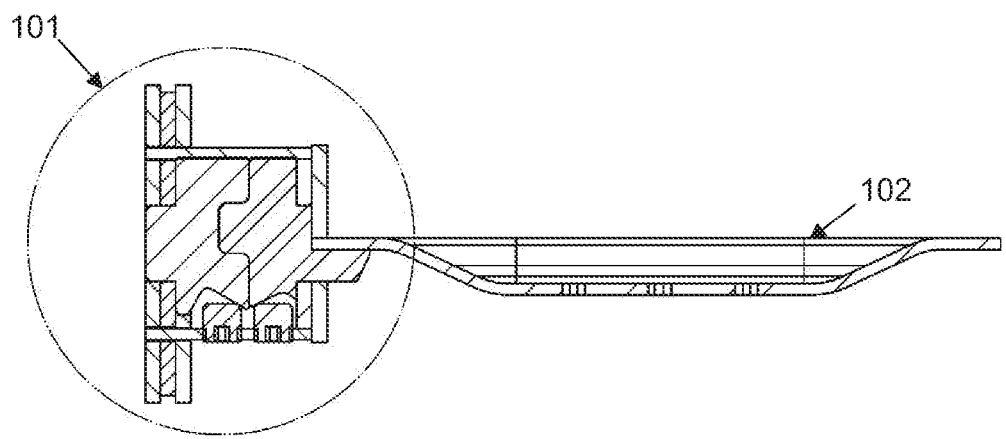
FIG. 4 is a cross-sectional view of the embodiment of FIG. 1 and the soap dish along the line X-X shown in FIG. 3 including a detailed cross-sectional view.
Figure 4:
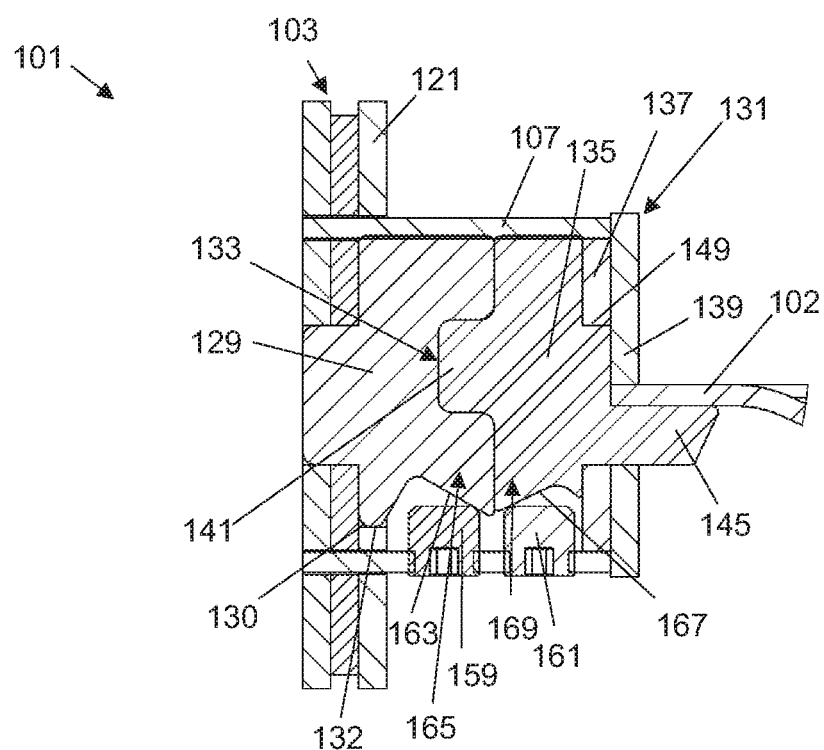
Figure 5:
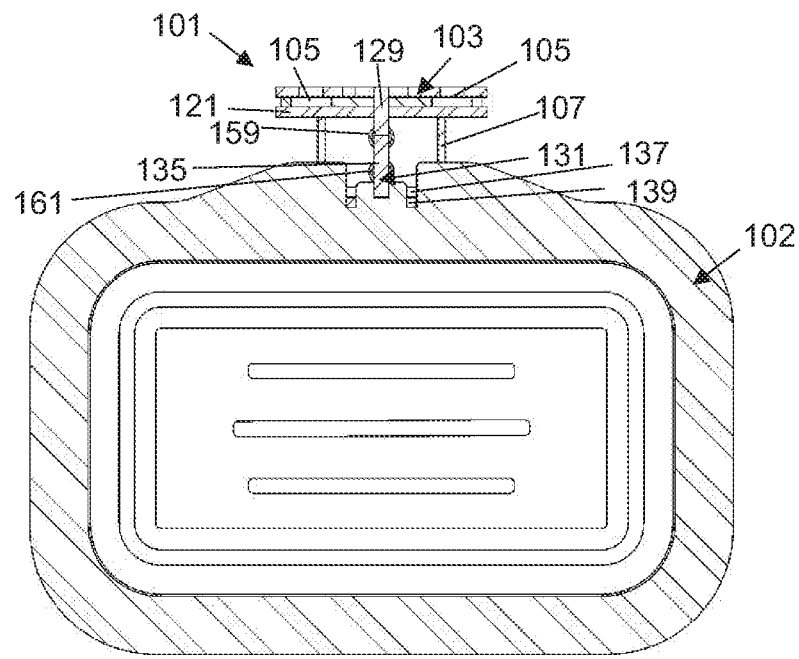
FIG. 5 is a cross-sectional view of the embodiment of FIG. 1 and the soap dish along the line Y-Y shown in FIG. 3.
Figure 6:
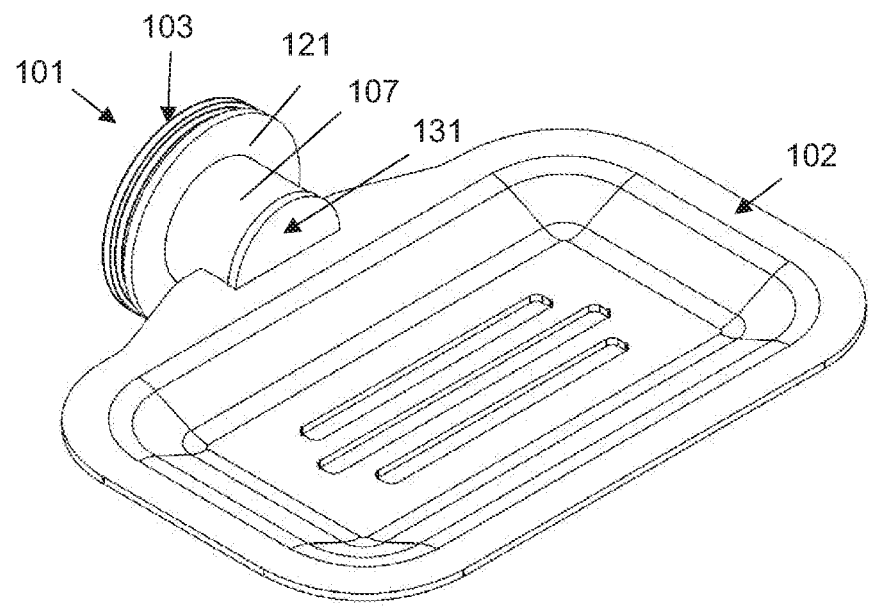
FIG. 6 is a three-dimensional view of the embodiment of FIG. 1 and the soap dish with the mounting assembly in an assembled condition.
Figure 7:
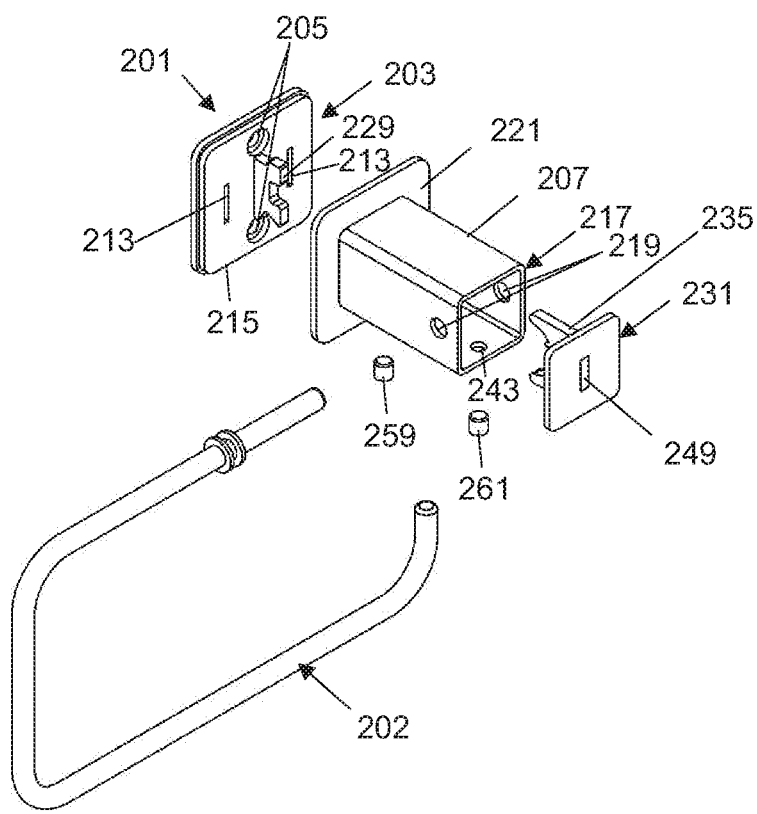
FIG. 7 is a three-dimensional view of a second embodiment of a mounting assembly for a toilet paper holder with the mounting assembly in a disassembled condition.

As shown most clearly in the cross-sectional views of the assembly in FIGS. 4 and 5, the projection (129) on the mounting bracket (103) and the cap (131), more particularly the interlocking member (135) of the cap (131), are held in engagement with each other and with the hollow member (107) with set screws (159, 161). The set screws (159, 161) extend through holes (143) in the hollow member at an underside thereof, the first set screw (159) engaging an inclined surface (163) of an operatively downward depending portion (165) of the projection (129) and the second set screw engaging an oppositely inclined surface (167) of an operatively downward extending part (169) of the cap (131). Both the projection (129) and the interlocking member (135) of the cap (131) are forced against the inside surface of the hollow member (107) by means of the set screws (159, 161) pressing against them. The cap (131) at least partially received and firmly secured within the end (117) of the hollow member (107) assists in securing the accessory (102) against movement relative to the mounting bracket (103).

Figure 8:
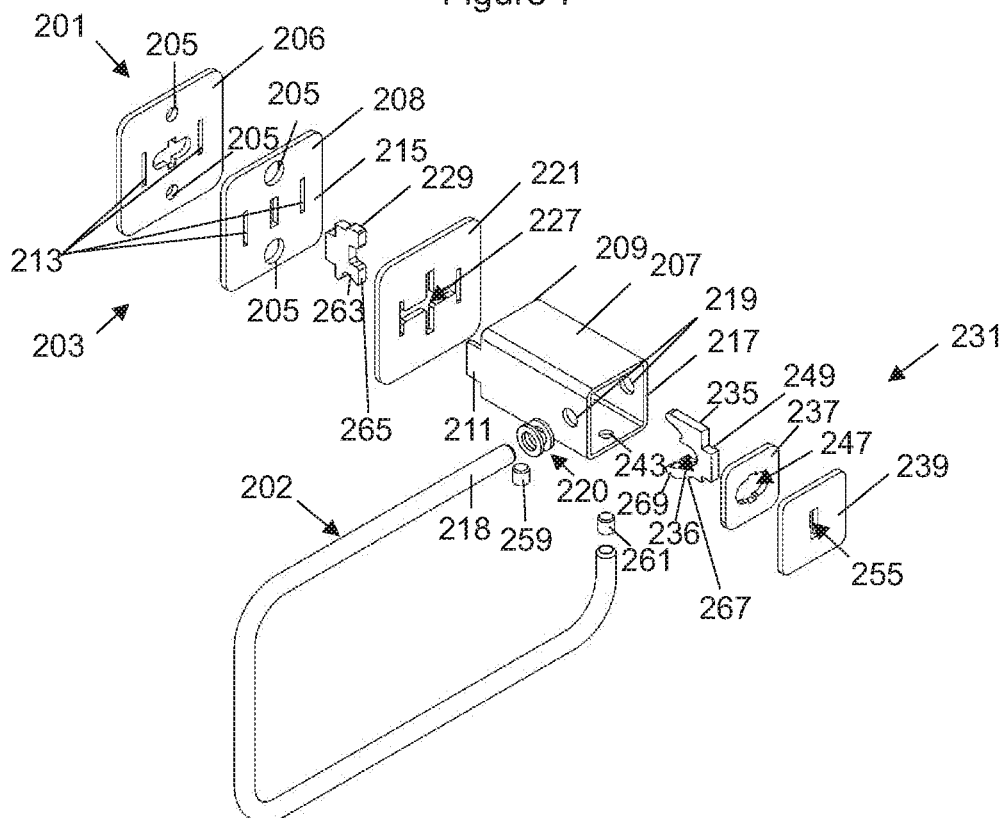
FIG. 8 is an exploded three-dimensional view of the embodiment of FIG. 7 showing all of the separately manufactured parts prior to joining and assembling the parts.
Figure 9:
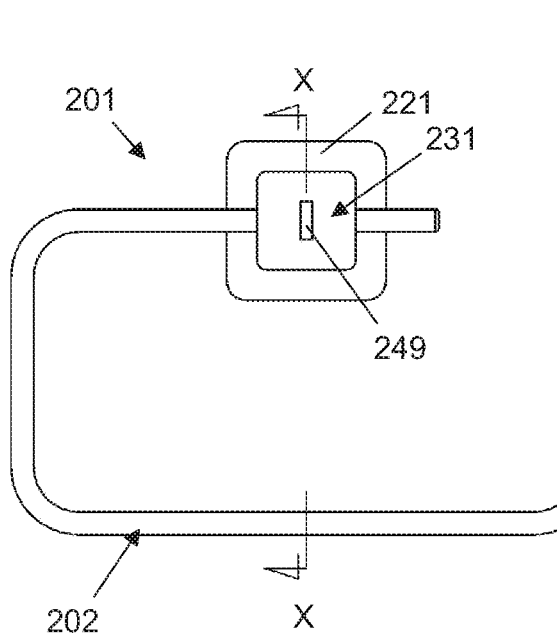
FIG. 9 is a front view of the embodiment of FIG. 7 with the toilet paper holder mounted thereto.

A second embodiment of a mounting assembly (201) for mounting a toilet paper roll holder (202) is shown in FIGS. 7 to 12 and includes a generally planar and rectangular mounting bracket (203) with two aligned apertures (205) arranged to receive fasteners such as screws for fastening the mounting bracket (203) to a vertically extending surface. As shown in FIG. 8, the mounting bracket (203) comprises first and second plates (206, 208) and a projection (229) that are welded together.

A support structure for the accessory is provided with a rectangular elongate hollow member (207) substantially surrounding it. The elongate hollow member (207) is releasably secured to the mounting bracket (203) with a grub screw (259) and extends transversely therefrom. The mounting bracket (203) and a first end (209) of the hollow member (207) have complementary male-and-female mating formations providing a mortise and tenon joint which prevents rotation of the elongate hollow member (207) relative to the mounting bracket (203) and provides a strong support for the hollow member (207) on the mounting bracket (203). As shown in FIG. 8, two parallel tenon tongues (211) extend lengthwise from opposite sides of the first end (209) of the hollow member (207) and two complementarily shaped mortise holes (213) are defined in the mounting bracket (203). The mortise holes (213) are spaced on the mounting bracket (203) to receive the tongues (211) in an assembled condition.

Locating formations (219) in the form of two holes through opposite sides of the hollow member (207) near the second end (217) of the elongate hollow member (207) receive part of the toilet paper holder accessory (202). The horizontally extending rail (218) of the accessory (202) passes through both holes (219) and collars (220) are provided over the rail (218) to secure the rail in place on the hollow member (207). The toilet paper holder is supported by the supporting structure inside the hollow member (207) in a manner that ensures that the toilet paper holder accessory (202) is capable of rotation in a vertical plane in its operative condition, when mounted to a wall.

A cover (221) is supported on the male tenon tongues (211) of the hollow member (207). In the assembled condition of the mounting assembly shown in FIGS. 9 to 12, the cover (221) extends over the major surface (215) of the mounting bracket (203) to conceal the apertures (205) and fasteners (not shown) from view. The cover also has a slot (227) that permits the projection (229) on the bracket (203) to extend therethrough.

The projection (229) on the mounting bracket (203) forms part of the supporting structure and provides securing means for releasably securing the elongate hollow member (207) to the mounting bracket (203) with a grub screw (259) with the cover (221) sandwiched between the mounting bracket (203) and the hollow member (207).

A cap (231) is releasably secured to the open, second end (217) of the hollow member (207). The cap (231) comprises a support member (235) and two plates (237, 239) that are welded together. The support member (235) has a recess as a supporting formation (236) arranged to receive and support the part (218) of the toilet paper holder accessory (202) extending through the rectangular member (207). The cap (231) is secured to the hollow member (207) with the grub screw (261) engaging the support member (235) on its surface (267) to press the cap (231) against the internal surface of the hollow member (207). The first plate (237) is sized and shaped to be received within the internal cavity of the hollow member (207) and includes an aperture (247) through which the stepped protrusion (249) of the support member (235) can pass so that the support member (235) abuts the plate (237) on either side of the stepped protrusion (249). The second plate (239) is sized and shaped to abut against the end (217) of the hollow member (207) and has a vertically extending aperture (255) for the support member (235) to extend through in the direction of the accessory (202). The cap (231) closes the end (217) of the rectangular member (207).

Figure 10:
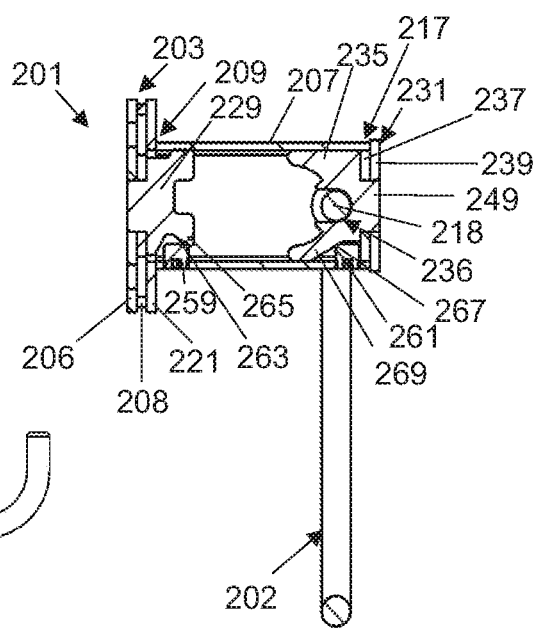
FIG. 10 is a cross-sectional view of the embodiment of FIG. 7 and the toilet paper holder viewed along the line X-X shown in FIG. 9.
Figure 11:
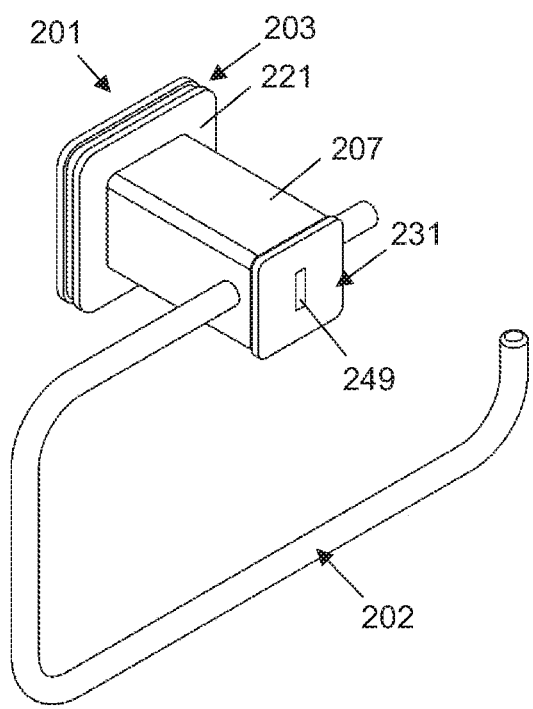
FIG. 11 is a three-dimensional view of the embodiment of FIG. 7 with the mounting assembly in an assembled condition and the toilet paper holder mounted thereto.
Figure 12:
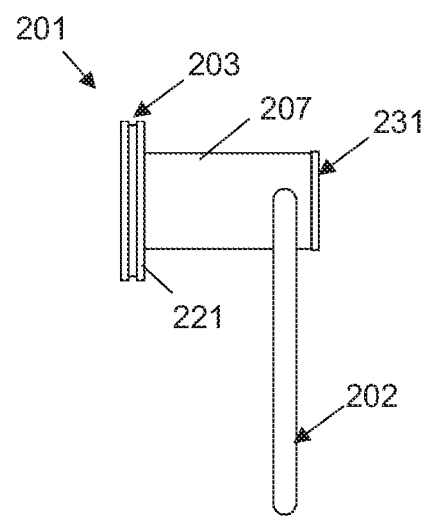
FIG. 12 is a side elevation of the embodiment of FIG. 7 with the mounting assembly in an assembled condition and the toilet paper holder mounted thereto.
Figure 16:
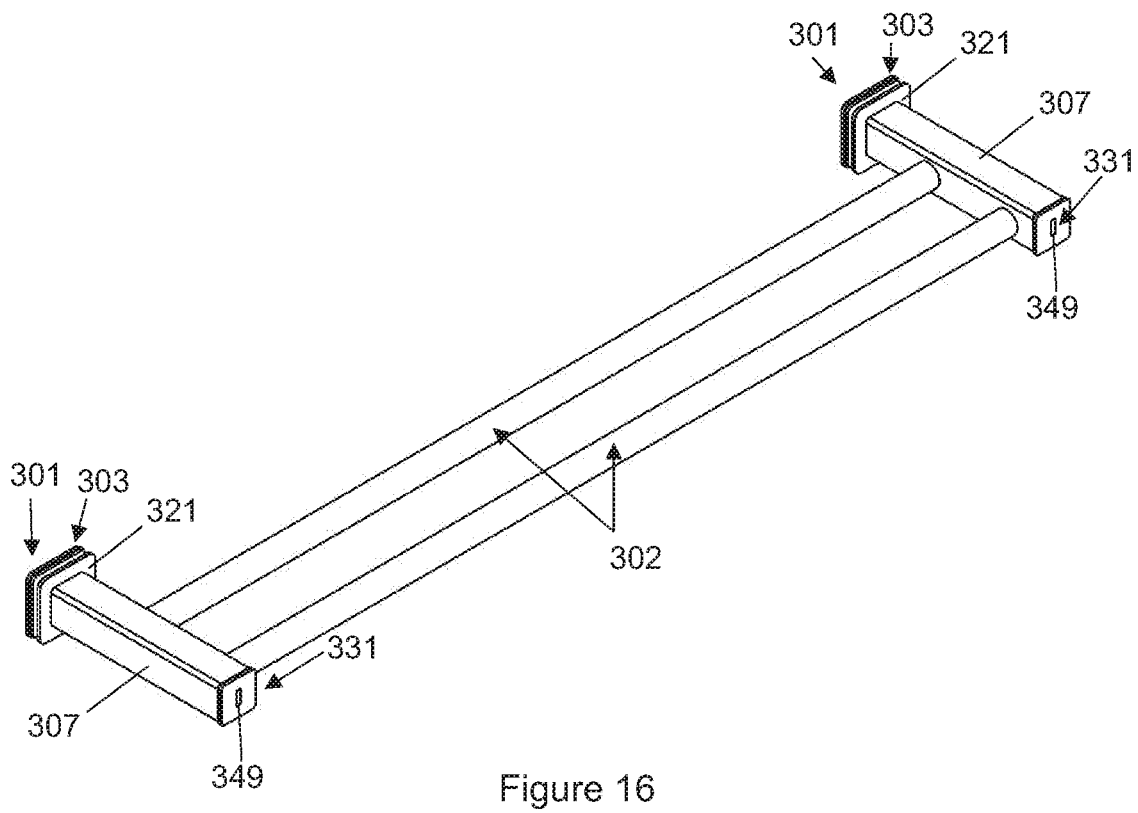
FIG. 16 is a three-dimensional view of the embodiment of FIG. 13 with the mounting assemblies on either end of the towel rails shown in an assembled condition.
Figure 17:
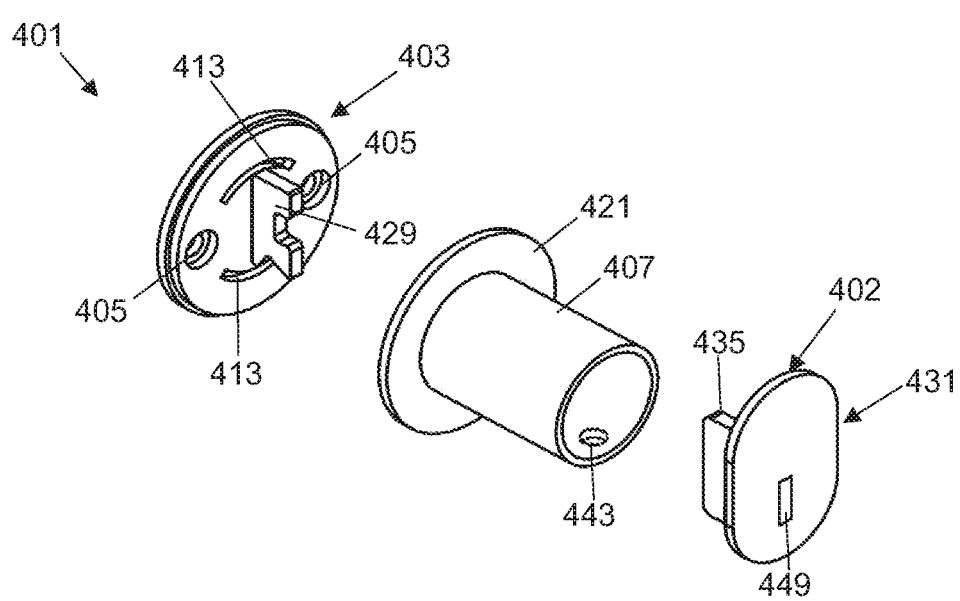
FIG. 17 is a three-dimensional view of a fourth embodiment of a mounting assembly in a disassembled condition.

As shown most clearly in the cross-sectional view of the assembly in FIG. 10, the projection (229) of the mounting bracket (203) and the cap (231), more particularly the support member (235) of the cap (231), are held in engagement with the hollow member (207) near opposite ends thereof with set screws (259, 261). The set screws (259, 261) extend through holes (243) in the hollow member at an underside thereof, the first set screw (259) engaging an inclined surface (263) of an operatively downward depending portion (265) of the projection (229) and the second set screw engaging an oppositely inclined surface (267) of an operatively downward extending part (269) of the cap (231), more particularly of the support member (235) forming part of the cap (231).

A third embodiment of a mounting assembly (301) for a mounting towel rails (302) is shown in FIGS. 13 to 16 in which two mounting assemblies (301) are provided at opposite ends of the towel rails (302). The mounting bracket (303) of the third embodiment has the same features and configuration as that of the second embodiment shown in FIGS. 7 to 12. The mounting bracket (303) includes two apertures (305) for screws. A support structure for the towel rails is provided between the mounting bracket (303) and towel rails (302), which includes an elongate hollow member (307) with a generally rectangular cross-sectional profile.

Locating formations (319) in the form of two holes spaced lengthwise along the length of the hollow member (307) and through the same sidewall of the hollow member (307) receive the ends of the towel rails (302) to support the rails (302) between the mounting assemblies (301).

The elongate hollow member (307) is releasably secured to the mounting bracket (303) with a grub screw (359).

The mounting bracket (303) and a first end (309) of the hollow member (307) have mortise and tenon formations which prevent rotation of the hollow member (307) relative to the mounting bracket (303) and provides a strong support for the hollow member (307) on the mounting bracket (303). The hollow member (307), in turn, supports the towel rails (302) in use. Two parallel tenon tongues (311) extend lengthwise from opposite sides of the first end (309) of the hollow member (307) and two complementarily shaped mortise holes (313) are defined through the generally flat mounting bracket (303).

A cover (321) is supported on the male tenon tongues (311) of the hollow member (307). In the assembled condition of the mounting assembly shown in FIGS. 14 and 16, the cover (321) extends over the major surface (315) of the mounting bracket (303) to conceal the apertures (305) and fasteners (not shown) from view. The cover also has a slot (not shown) that permits the projection (329) on the bracket (303) to extend therethrough. The projection (329) on the mounting bracket (303) forms part of the securing means for releasably securing the elongate hollow member (307) to the mounting bracket (303) with the cover (321) sandwiched therebetween.

A cap (331) is releasably secured to the open, second end (317) of the hollow member (307). The cap (331) includes a support member (335) and two rectangular plates (337, 339) that are welded together. The cap (331) is secured to the hollow member (307) with the grub screw (361) engaging the support member (335) on its surface (367) to press the cap (331) against the internal surface of the hollow member (307). The first plate (337) is sized and shaped to be received within the internal cavity of the hollow member (307) and includes an aperture through which the stepped protrusion (349) of the support member (335) can pass. The second plate (339) is sized and shaped to abut against the end (317) of the hollow member (307) so as to be on the exterior of the hollow member (307) and has a vertically extending aperture for the support member (335) to extend through in the direction of the accessory (302). The cap (331) closes the end (317) of the rectangular member (307).

As shown in the cross-sectional view of the assembly in FIGS. 14 and 15, the projection (329) of the mounting bracket (303) is held in engagement with the hollow member (307) with a set screw (359). Near the opposite end (317) of the hollow member (307), the cap (331) is held in engagement with the hollow member (307) with a second set screw (361). The set screws (359, 361) extend through holes (343) on the same side or through the same sidewall of the hollow member (307). When installed, these holes (343) and the set screws (359, 361) are on the underside of the mounting assembly (301) so that they are generally hidden from the view of users. The first set screw (359) engages an inclined surface (363) of an operatively downward depending portion (365) of the projection (329) and the second set screw engaging an oppositely inclined surface (367) of an operatively downward extending part (369) of the cap (331), more particularly of the support member (335) forming part of the cap (331).

The cap (331) further includes two protuberances (371) that are arranged to be slideably received into two slots (not shown) provided in the ends of the towel rail (302) to locate the towel rail (302) in position on the mounting assembly (301) and prevent rotation of the towel rail (302) about its own axis.

A fourth embodiment of a mounting assembly (401) is shown in FIGS. 17 to 21. In this embodiment, the accessory (402) is defined by the cap (431) and the hollow member (407) of the assembly (401). The accessory (402) is an extension of the cap (431) which together with the hollow member (407) forms a hook for hanging towels or the like.

The mounting assembly (401) includes a mounting bracket (403) of the same shape and configuration as that of the first embodiment of the mounting assembly shown in FIGS. 1 to 6. The mounting bracket (403) includes apertures (405) for fasteners, arcuate holes (413) and a projection (429) that cooperates with a grub screw (459) to releasably secure a first end (409) of a tubular hollow member (407) to the mounting bracket (403) with a cover (421) sandwiched therebetween.

Two circumferentially spaced arcuate tongues (411) extend lengthwise from the first end (409) of the hollow member (407) and two complementarily shaped holes (413) are provided through the generally flat mounting bracket (403) for receiving the tongues (411). The arcuate tongues and holes cooperatively prevent rotation of the hollow member (407) relative to the mounting bracket (403) whilst providing a strong support of the hollow member (407) around a portion of the circumference of the hollow member (407) that is inserted into the mounting bracket (403).

The cover (421) for the mounting bracket (403) conceal the apertures (405) for the fasteners. The cover (421) has apertures that receive the tongues (411) so that the cover can be assembled to the hollow member (407) before securing it to the mounting bracket (403) with the grub screw (459).

The opposite end (417) of the hollow member (407) is closed by the cap (431) and hook accessory (402) that is releasably secured to the opposite end (417) with a second grub screw (461). The cap (431) is partially received within the open end (417).

The cap (431) includes an internal support member (435) and two plates structures (437, 439) that are welded together. The cap (431) is secured to the hollow member (407) with the grub screw (461) engaging the internal support member (435) on its surface (467) to press the cap (431) against the upper internal surface of the hollow member (407). The first plate (437) is sized and shaped to be received within the internal cavity of the hollow member (407) and includes an aperture through which the stepped protrusion (449) of the support member (435) can pass. The second plate (439) is sized and shaped to abut against the end (417) of the hollow member (407) so as to be on the exterior of the hollow member (407). The plate (439) is oblong to thereby define a hook for towels together with the hollow member (407). The plate (439) has a vertically extending aperture for the support member (435) to extend through.

As shown in the cross-sectional view of the assembly in FIG. 19, the projection (429) of the mounting bracket (403) is held in engagement with the upper internal surface of the hollow member (407) with a grub screw (459). Similarly, the cap (431) is held in engagement with the upper inner surface of the hollow member (407) with a second grub screw (461). The grub screws (459, 461) extend through holes (443) spaced lengthwise and on the same side of the hollow member (407). The first grub screw (459) engages an inclined surface (463) of an operatively downward depending portion (465) of the projection (429) and the second grub screw (461) engages an oppositely inclined surface (467) of an operatively downward extending part (469) of the support member (435) of the cap (431).

The mounting assembly described herein may be made of a metal, preferably a corrosion resistant metal such as stainless steel. The various parts of the mounting assembly, save for the set screws, may be manufactured by cutting sheet metal and metal tubing to shape with a laser cutter. The parts are therefore relatively simple and quick to manufacture. The various parts of the mounting assembly cooperate by means of lock and key type formations to resist rotation and displacement of the cover, hollow member, cap and, in some embodiments, the accessory relative to the mounting bracket that is securely fastened to the wall. The parts are shaped to cooperate in this manner so that less welding and less machined parts are required to obtain a secure mounting assembly.

The above description is by way of example only and it should be appreciated that numerous changes and modifications may be made to the mounting assembly and the supporting structure without departing from the scope of the invention. The mounting bracket, cover, hollow member and the like may have any suitable shape. The cooperating male or female mating formations may be on either one of the mounting bracket and elongate hollow member and may have any suitable complementary shape. It should also be apparent that any suitable locating or attachment formations may be provided on the hollow member to secure the accessory thereto. Similarly, any suitable supporting structure or engagement means may be provided between the mounting bracket and the accessory to engage the accessory thereto.

Throughout the specification unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A mounting assembly for mounting an accessory comprising:
   a mounting bracket with an aperture arranged to receive a fastener for fastening the mounting bracket to a surface;
   an elongate hollow member which is releasably securable to the mounting bracket, the mounting bracket and the elongate hollow member having complementary male and female mating formations which are arranged to inhibit rotation of the elongate hollow member relative to the mounting bracket when secured thereto; and
   a supporting structure configured to be positioned between the mounting bracket and the accessory with, in an assembled condition, the elongate hollow member substantially surrounding the supporting structure,
   wherein the supporting structure includes a projection on the mounting bracket which, in an assembled condition of the assembly, extends into a cavity defined by the hollow member and is configured to engage an internal surface of the elongate hollow member and a cap provided on an open, second end of the elongate hollow member, the cap having an internal portion which extends into the cavity defined by the hollow member and is configured to engage an internal surface of the hollow member, and wherein at least two set screws extend through holes in the hollow member on the same side thereof, a first set screw engaging an inclined surface of the projection and the second set screw engaging an oppositely inclined surface of the cap to secure the mounting bracket and cap to the elongate hollow member.

2. The mounting assembly as claimed in claim 1, which includes a cover configured to be positioned between the mounting bracket and the hollow member, the cover being shaped to conceal the aperture.

3. The mounting assembly as claimed in claim 2, wherein the cover is complementarily shaped to the mounting bracket and has openings through which the male mating formations may extend.

4. The mounting assembly as claimed in claim 1, wherein the complementary male and female mating formations are mortise and tenon formations arranged to inhibit axial rotation and rotation in a plane generally transverse to the longitudinal axis of the hollow member relative to the mounting bracket.

5. The mounting assembly as claimed in claim 4, wherein one or more tenon tongues extend from a first end of the hollow member and one or more complementarily shaped mortise holes are defined in the mounting bracket for receiving the tenon tongues.

6. The mounting assembly as claimed in claim 4, wherein at least two tenon tongues are provided on opposite sides of the first end of the hollow member and at least two complementarily shaped mortise holes are defined in spaced relation on a surface of the mounting bracket to receive the tenon tongues.

7. The mounting assembly as claimed in claim 4, wherein the hollow member is tubular and one or more circumferentially spaced arcuate tongues extend from the first end of the hollow member so as to cooperate with one or more arcuate grooves in the mounting bracket.

8. The mounting assembly as claimed in claim 4, wherein the hollow member has a rectangular cross-sectional profile and the tenon tongues and mortise holes are rectangular.

9. The mounting assembly as claimed in claim 1, wherein the hollow member includes a locating formation for the accessory that is configured to partially receive the accessory.

10. The mounting assembly as claimed in claim 9, wherein the locating formation is a receptacle or a slot.

11. The mounting assembly as claimed in claim 1, wherein the internal portion of the cap and the projection has complementary mating formations that are shaped to inhibit rotation of the cap.

\* \* \* \* \*